No. 698,176. Patented Apr. 22, 1902.
F. R. CORNWALL.
SIDE BEARING FOR RAILWAY CARS.
(Application filed Feb. 28, 1902.)
(No Model.)
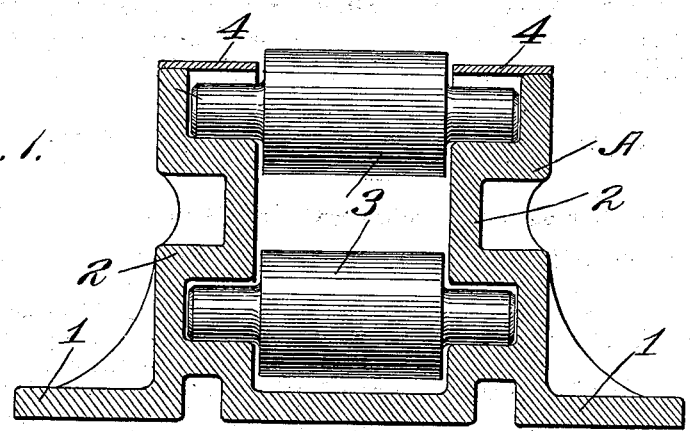
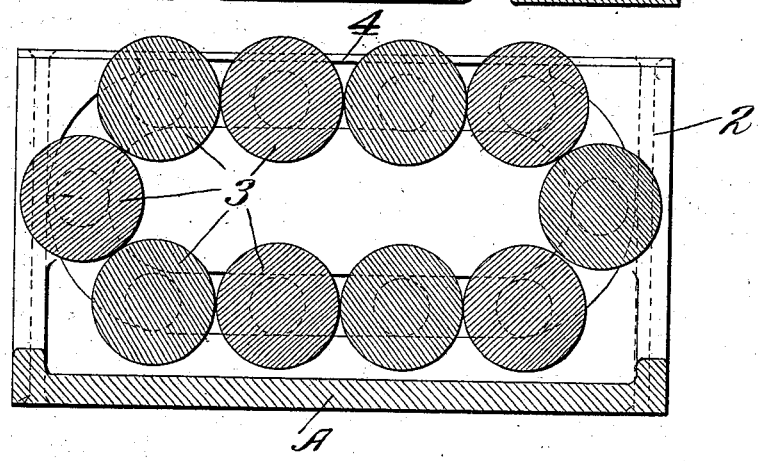
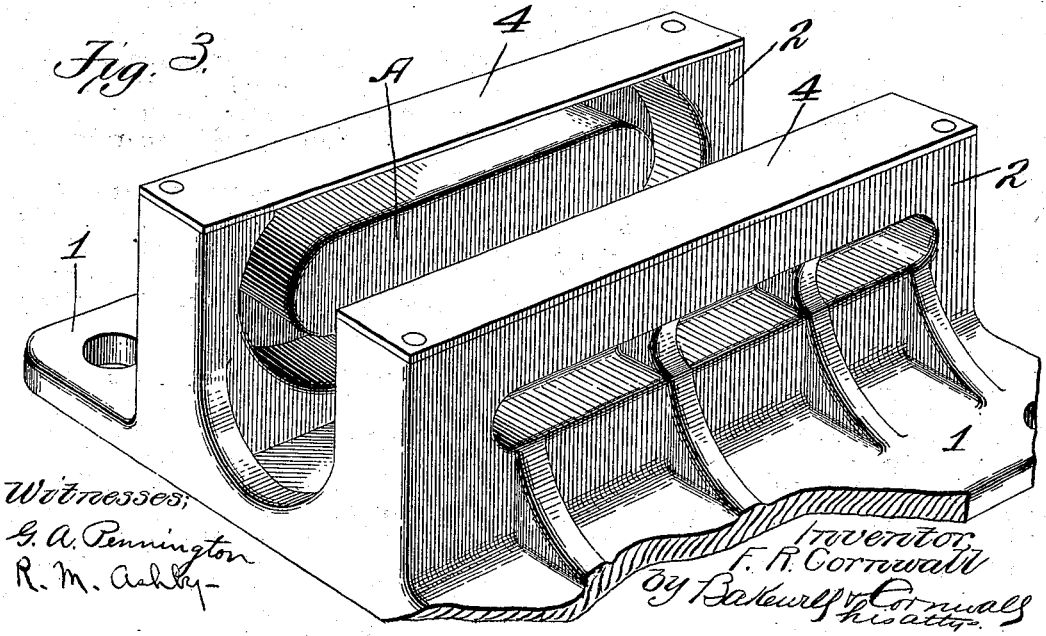
Witnesses:
G. A. Pennington
R. M. Ashby
Inventor,
F. R. Cornwall
By Bakewell & Cornwall
his attys.
THE NORRIS PETERS CO., PHOTO-LITHO., WASHINGTON, D. C.

UNITED STATES PATENT OFFICE.

FREDERICK R. CORNWALL, OF ST. LOUIS, MISSOURI, ASSIGNOR TO CHICAGO RAILWAY EQUIPMENT COMPANY, OF CHICAGO, ILLINOIS, A CORPORATION OF ILLINOIS.

SIDE BEARING FOR RAILWAY-CARS.

SPECIFICATION forming part of Letters Patent No. 698,176, dated April 22, 1902.

Application filed February 28, 1902. Serial No. 96,096. (No model.)

*To all whom it may concern:*

Be it known that I, FREDERICK R. CORNWALL, a citizen of the United States, residing at the city of St. Louis, State of Missouri, have invented a certain new and useful Improvement in Side Bearings for Railway-Cars, of which the following is a full, clear, and exact description, such as will enable others skilled in the art to which it appertains to make and use the same, reference being had to the accompanying drawings, forming part of this specification, in which—

Figure 1 is a cross-sectional view through my improved side bearing. Fig. 2 is a longitudinal sectional view through the same, and Fig. 3 is a detail view showing the supporting block or casting in which the rollers are mounted.

This invention relates to a new and useful improvement in side bearings for railway-cars, the object being to construct the device in a simple and cheap manner, reducing the number of parts entering into the completed bearing, and at the same time producing an efficient, strong, and durable bearing of the character described.

With these objects in view my invention consists in the construction, arrangement, and combination of the several parts, all as will hereinafter be described and afterward pointed out in the claims.

In the drawings, A indicates a casting, which is preferably provided with attaching lugs or flanges 1 and parallel side walls 2. These side walls have their inner faces formed with continuous endless grooves for receiving the axles of the rollers.

3 indicates the rollers, which are formed with reduced axles at their ends, fitting in said endless grooves and forming an endless chain of rollers supported in position wholly by their axles. By mounting the rollers in this manner the peripheral speed thereof is sufficient to enable the body-bearing (not shown) to travel a greater horizontal distance than the displacement of the rollers with which it is in contact. The top walls of the upper portion of the endless grooves in the inner faces of the parallel side walls of the casting are formed by removable plates 4, which are preferably riveted in position. These plates are provided only to prevent vertical displacement of the rollers. It is obvious that where the rollers are cylindrical the axles should be of the same diameter and that the vertical grooves receiving the axles should be of the same dimensions. However, where it is desired that the rollers shall be coned to accommodate the arc of movement of the body-bearing the groove in the outer wall can be made of greater length circumferentially to receive enlarged axles at the outer ends of the rollers. In this manner the two walls shown parallel in the drawings can also be curved at the arc of a circle described from the king-pin of the truck.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a side bearing for cars, the combination with supports formed with endless grooves in their inner faces, and an endless chain of rollers whose axles are received in said grooves, whereby said rollers are supported wholly by their axles; substantially as described.

2. In a side bearing for cars, the combination with walls formed with endless grooves in their inner faces, of an endless chain of rollers formed with axles of smaller diameter than the body portion of the rollers, said axles being received in said grooves for supporting the rollers in position, whereby the circumferential speed of the rollers exceeds their horizontal displacement; substantially as described.

3. In a side bearing for cars, the combination with a casting formed with upwardly-extending walls having grooves in their inner faces, of an endless chain of rollers whose axles are received in said grooves, said axles wholly supporting the rollers in position, and removable plates which form the top walls of the upper portion of said grooves; substantially as described.

In testimony whereof I hereunto affix my signature, in the presence of two witnesses, this 24th day of February, 1902.

FREDERICK R. CORNWALL.

Witnesses:
GEORGE BAKEWELL,
LENORE WILSON.